US012650542B2

(12) United States Patent
Baek et al.

(10) Patent No.: US 12,650,542 B2
(45) Date of Patent: Jun. 9, 2026

(54) DISPLAY DEVICE

(71) Applicant: SAMSUNG DISPLAY CO., LTD.,
Yongin-si (KR)

(72) Inventors: Myunghun Baek, Hwaseong-si (KR);
Taehee Kim, Asan-si (KR);
Chaekyeong Lee, Hwaseong-si (KR)

(73) Assignee: SAMSUNG DISPLAY CO., LTD.,
Yongin-si (KR)

( * ) Notice: Subject to any disclaimer, the term of this
patent is extended or adjusted under 35
U.S.C. 154(b) by 1225 days.

(21) Appl. No.: 17/539,289

(22) Filed: Dec. 1, 2021

(65) Prior Publication Data

US 2022/0334293 A1      Oct. 20, 2022

(30) Foreign Application Priority Data

Apr. 15, 2021      (KR) ......................... 10-2021-0049103

(51) Int. Cl.
| | |
|---|---|
| *G02B 5/00* | (2006.01) |
| *G02B 1/14* | (2015.01) |
| *G06F 1/16* | (2006.01) |
| *G09F 9/33* | (2006.01) |

(52) U.S. Cl.
CPC .............. *G02B 5/003* (2013.01); *G02B 1/14*
(2015.01); *G06F 1/1656* (2013.01); *G09F*
*9/335* (2021.05)

(58) Field of Classification Search
CPC .......... G02B 5/033; G02B 1/14; G09F 9/335;
G06F 1/1656
USPC ....................................................... 359/601
See application file for complete search history.

(56) References Cited

U.S. PATENT DOCUMENTS

| | | | | |
|---|---|---|---|---|
| 2014/0285953 A1* | 9/2014 | Hirai | ..................... | G06F 1/1637 |
| | | | | 361/679.01 |
| 2017/0343852 A1* | 11/2017 | Park | ................... | H10K 50/8426 |
| 2018/0220972 A1 | 8/2018 | Jeong et al. | | |
| 2019/0250793 A1* | 8/2019 | Choi | ..................... | H04M 1/724 |

FOREIGN PATENT DOCUMENTS

| | | |
|---|---|---|
| KR | 10-0578309 | 5/2006 |
| KR | 10-0969473 | 7/2010 |
| KR | 10-1206608 | 11/2012 |
| KR | 10-1388181 | 4/2014 |
| KR | 10-2014-0115156 A | 9/2014 |
| KR | 10-2017-0134842 A | 12/2017 |
| KR | 10-2018-0090616 A | 8/2018 |
| KR | 20-0488235 | 12/2018 |
| WO | WO-2016033253 A1 * | 3/2016 ............... B05D 1/02 |

OTHER PUBLICATIONS

Office Action dated Feb. 19, 2025 from the Korean Intellectual
Property Office (KIPO) for corresponding Korean Patent Applica-
tion No. 10-2021-0049103.

* cited by examiner

*Primary Examiner* — Jerry L Brooks
(74) *Attorney, Agent, or Firm* — F. CHAU &
ASSOCIATES, LLC

(57) ABSTRACT

A display device includes a display panel configured to
display an image. A base member is disposed on the display
panel and includes a display area and a non-display area
adjacent to the display area. The base member has a first
surface facing the display panel. A first groove is formed on
the first surface in the non-display area. A first light blocking
member is disposed on the first surface of the base member
and extends along at least a portion of the first surface
positioned between the display area and the first groove.

22 Claims, 9 Drawing Sheets

1

2

DISPLAY DEVICE

This application claims priority under 35 U.S.C. § 119 to Korean Patent Application No. 10-2021-0049103, filed on Apr. 15, 2021 in the Korean Intellectual Property Office, the disclosure of which is incorporated by reference in its entirety herein.

TECHNICAL FIELD

Embodiments of the present inventive concept relate generally to a display device. More particularly, embodiments of the present inventive concept relate a display device including a cover window.

DISCUSSION OF RELATED ART

A display device may include a cover window and a display panel. The cover window is disposed on the display panel and protects the display panel from damage due to scratches or physical impacts. In addition, the cover window may be divided into a display area in which an image is displayed by the display panel and a non-display area adjacent to the display area in which an image is not displayed by the display panel. A light blocking member, such as light blocking ink, may be printed on the non-display area of the cover window to partially block light emitted from the display panel.

SUMMARY

Embodiments of the present inventive concept provide a display device including a cover window.

According to an embodiment of the present inventive concept, a display device includes a display panel config-ured to display an image. A base member is disposed on the display panel and includes a display area and a non-display area adjacent to the display area. The base member has a first surface facing the display panel. A first groove is formed on the first surface in the non-display area. A first light blocking member is disposed on the first surface of the base member and extends along at least a portion of the first surface positioned between the display area and the first groove.

In an embodiment, the first light blocking member may be disposed in the first groove and the first groove defines a boundary of the first light blocking member.

In an embodiment, the first light blocking member may fill the first groove.

In an embodiment, the first light blocking member is disposed on the non-display area.

In an embodiment, the non-display area may be defined to surround the display area and the first groove may be formed adjacent to an outer portion of the non-display area.

In an embodiment, the display area includes at least one hole area. At least one functional module overlaps the at least one hole area. The base member includes a second groove formed to surround the hole area.

In an embodiment, the display device may further include a second light blocking member disposed to surround the hole area and filling the second groove.

In an embodiment, the non-display area of the base member may be relatively flat.

In an embodiment, the non-display area of the base member may be curved toward the display panel.

In an embodiment, the display area of the base member may be relatively flat.

In an embodiment, the base member may further include a second surface opposing the first surface and a side surface connecting the first surface and the second surface and the side surface adjacent to the first surface may be a chamfered surface that is inclined.

In an embodiment, the first groove may be formed between the chamfered surface and the display area.

In an embodiment, the side surface adjacent to the second surface may be a round surface.

In an embodiment, the first groove may be formed using a laser.

In an embodiment, the display panel may include a substrate, at least one thin film transistor disposed on the substrate, and a light emitting diode electrically connected to the at least one thin film transistor.

In an embodiment, the light emitting diode may include a first electrode connected to the thin film transistor, an organic emission layer disposed on the first electrode, and a second electrode disposed on the organic emission layer.

According to an embodiment of the present inventive concept, a display device may include a display panel configured to display an image. A base member is disposed on the display panel and includes a display area and a non-display area adjacent to the display area. The base member has a first surface facing the display panel and a chamfered surface adjacent to the first surface and inclined. A first groove is formed on the first surface in the non-display area. A first light blocking member is disposed on the first surface of the base member and extends along at least a portion of the first surface between the display area and the first groove.

In an embodiment, the first light blocking member may fill the first groove.

In an embodiment, the non-display area may be defined to surround the display area, and the first groove may be formed adjacent to an outer portion of the non-display area.

In an embodiment, the display area includes at least one hole area. At least one functional module overlaps the at least one hole area. The base member includes a second groove formed to surround the hole area.

According to an embodiment of the present inventive concept, a display device includes a display panel config-ured to display an image. A base member is disposed on the display panel and includes a display area and a non-display area adjacent to the display area. The base member has a first surface facing the display panel. A first groove is formed on the first surface in the non-display area. The first groove has a semi-elliptical shape in a cross-section. A first light block-ing member is disposed in the first groove and extends along at least a portion of the non-display area.

In an embodiment, the first groove defines an outer boundary of the first light blocking member.

Therefore, a display device according to embodiments of the present inventive concept may include a cover window and a display panel. The cover window may include a base member and a light blocking member. A groove may be formed in the base member, and the light blocking member may be disposed with the groove as a boundary. As the groove having a semi-elliptical shape is formed in the base member, the surface resistance of the surface of the groove may be increased, and the periphery of the groove may be hydrophobized. Accordingly, the light blocking member may fill the groove and might not overflow out of the groove. Accordingly, the processing precision of the light blocking member may be increased. Accordingly, the light blocking member may be accurately printed on a target area.

BRIEF DESCRIPTION OF THE DRAWINGS

The accompanying drawings, which are included to provide a further understanding of the invention and are incorporated in and constitute a part of this specification, illustrate embodiments of the present inventive concept, and together with the description serve to explain embodiments of the present inventive concept.

DETAILED DESCRIPTION OF EMBODIMENTS

Figure 1:
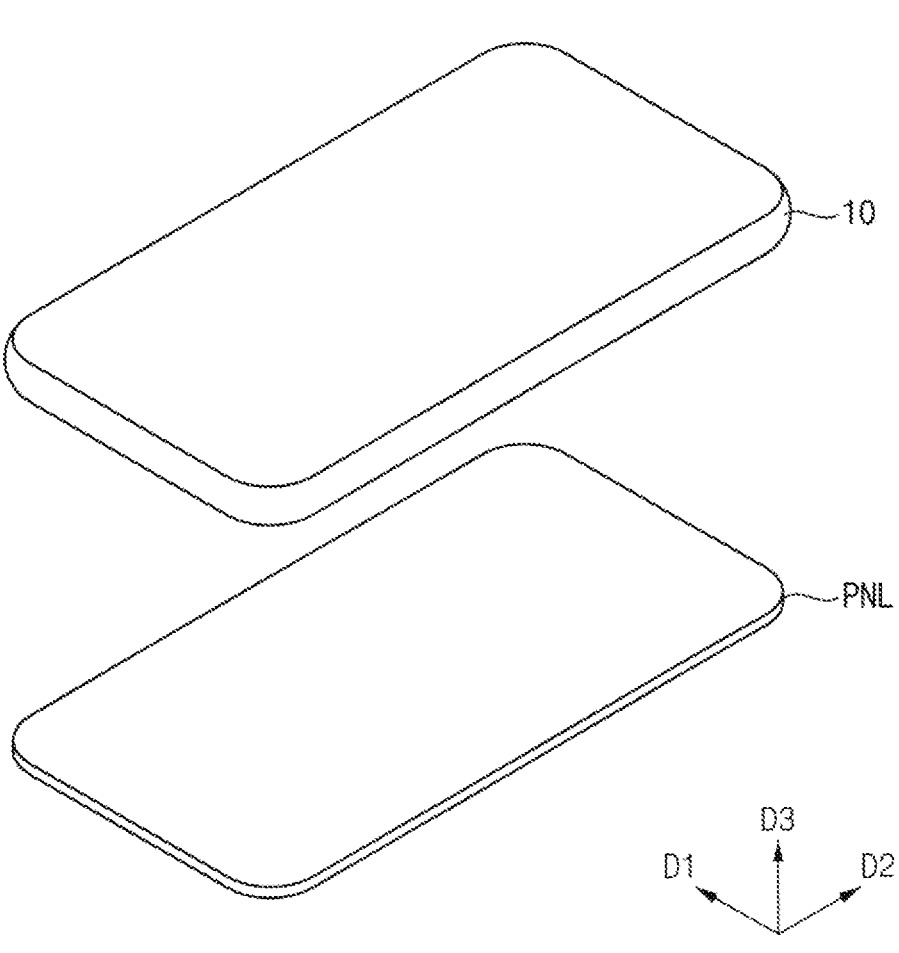
FIG. 1 is an exploded perspective view illustrating a display device according to an embodiment of the present inventive concept.

Illustrative, non-limiting embodiments will be more clearly understood from the following detailed description in conjunction with the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe the relationship of one element to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. For example, the term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. For example, the terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10%, 5% of the stated value. Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and the present inventive concept, and will not be interpreted in an idealized or overly formal sense unless expressly so defined herein.

FIG. 1 is an exploded perspective view illustrating a display device according to an embodiment.

Referring to FIG. 1, a display device 1 according to an embodiment of the present inventive concept may include a display panel PNL and a cover window 10. However, embodiments of the present inventive concept are not limited thereto. For example, in some embodiments, the display device 1 may include one or more additional members, such as a touch panel, a polarizing layer, a protective film, a housing, etc.

The display panel PNL may display an image in response to a gate signal and a data voltage which are input into the display panel PNL. For example, in an embodiment, the display panel PNL may be any one of an organic light emitting display panel, an inorganic light emitting display panel, a liquid crystal display panel, a plasma display panel, an electrophoretic display panel, and a quantum-dot display panel. However, embodiments of the present inventive concept are not limited thereto. Hereinafter, an embodiment in which the display panel PNL is an organic light emitting display panel will be described for convenience of explanation.

In an embodiment, the display panel PNL may have a rectangular shape extending in a first direction D1 and a second direction D2, respectively. For example, the display panel PNL1 may have a relatively short side extending in the first direction D1 and a relatively long side extending in the second direction D2. In an embodiment, the first and second directions D1, D2 may be orthogonal to each other. However, embodiments of the present inventive concept are not limited thereto and the first and second directions D1, D2 may cross each other at various different angles. For example, in an embodiment, an edge where the relatively short side and the relatively long side meet may be formed at a right angle or may have a curvature. However, the planar shape of the display panel PNL is not limited thereto. For example, the planar shape of the display panel PNL (e.g., in a plane defined in the first and second directions D1, D2) in some embodiments may be a polygon, a circle, an ellipse or an irregular shape rather than a rectangle.

The cover window 10 may cover the display panel PNL in a third direction D3 and may protect the display panel PNL. In an embodiment, the third direction D3 may be a thickness direction of the display panel PNL and may be orthogonal to the first and second directions D1, D2. In an embodiment, the cover window 10 may have a shape substantially the same as the shape of the display panel PNL, and may have a planar area larger than a planar area of the display panel PNL.

Figure 2:
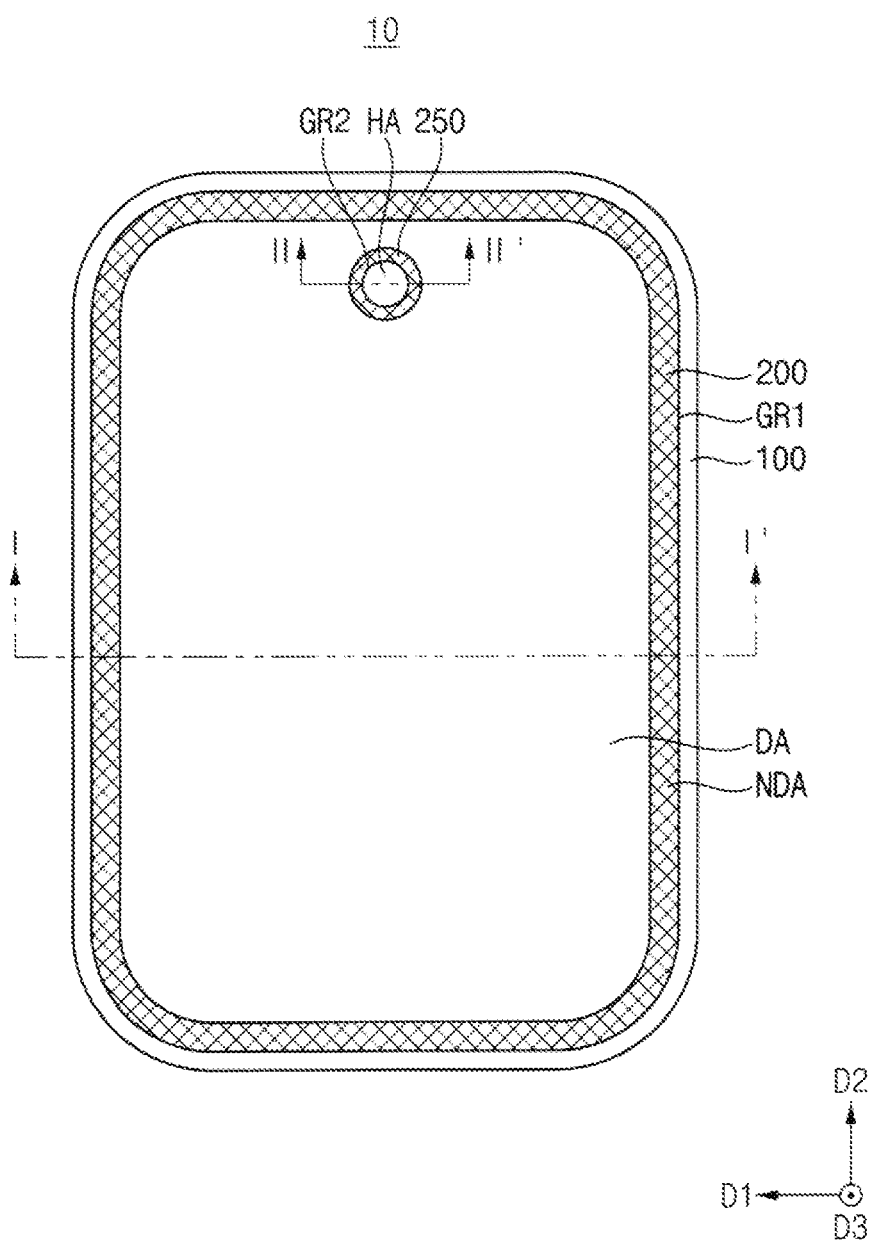
FIG. 2 is a plan view illustrating a cover window included in the display device of FIG. 1 according to an embodiment of the present inventive concept.
Figure 3:
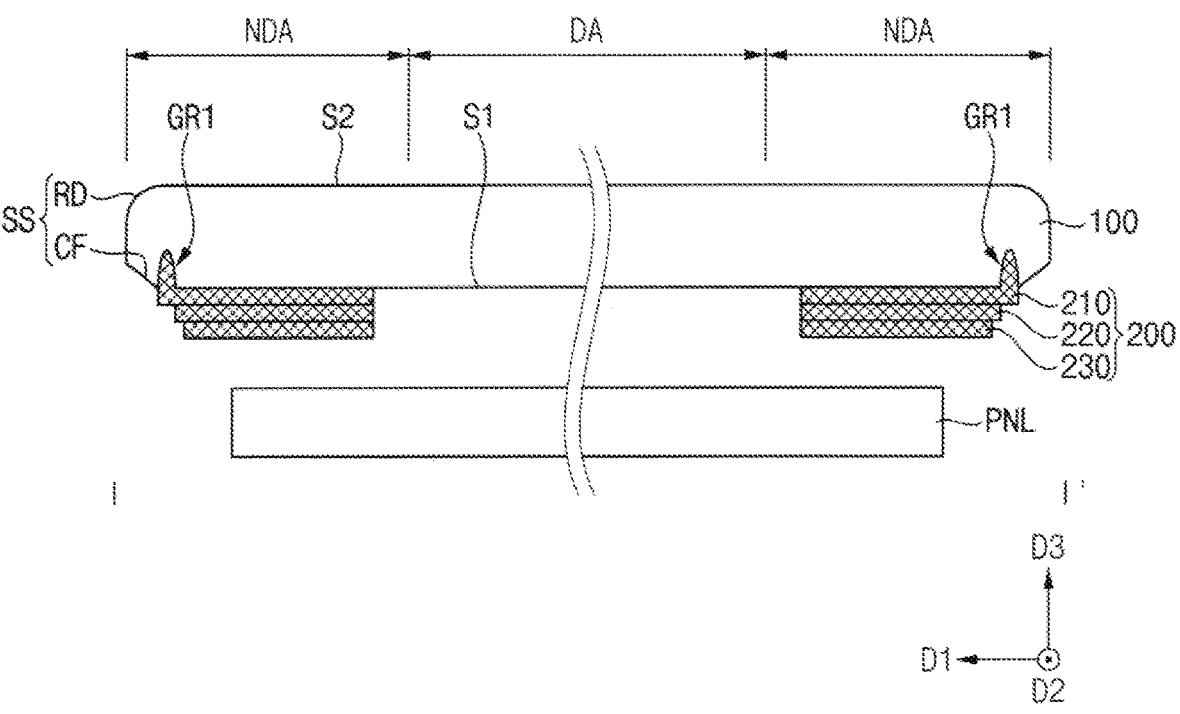
FIG. 3 is a cross-sectional view taken along line I-I' of FIG. 2 illustrating the display device of FIG. 1 according to an embodiment of the present inventive concept.
Figure 4:
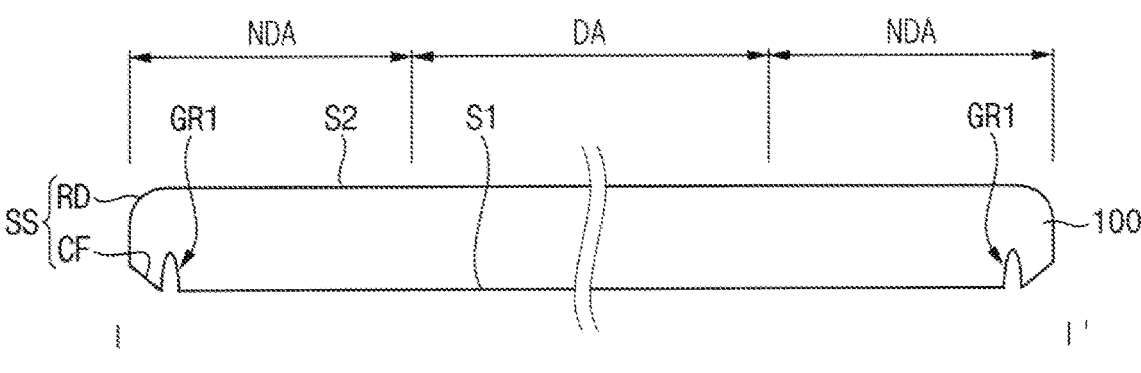
FIG. 4 is a cross-sectional view taken along line I-I' of FIG. 2 illustrating a base member included in the display device of FIG. 1 according to an embodiment of the present inventive concept.
Figure 4:
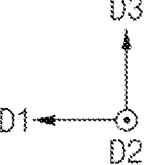
Figure 5:
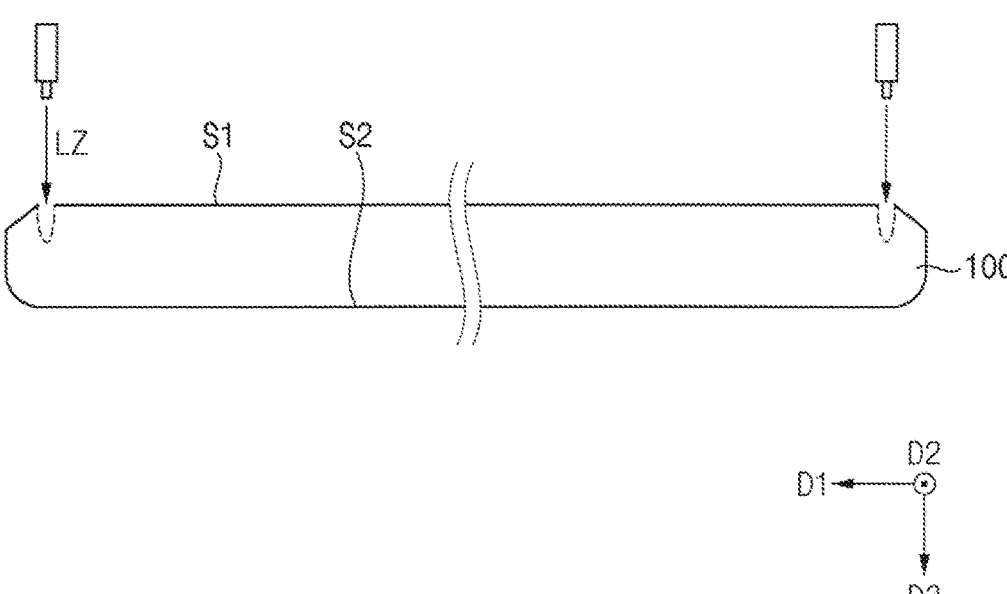
FIG. 5 is a cross-sectional view illustrating a method of manufacturing the base member of FIG. 4 according to an embodiment of the present inventive concept.

FIG. 2 is a plan view illustrating a cover window included in the display device of FIG. 1. FIG. 3 is a cross-sectional view illustrating the display device of FIG. 1. FIG. 4 is a cross-sectional view illustrating a base member included in the display device of FIG. 1. FIG. 5 is a cross-sectional view illustrating a method of manufacturing the base member of FIG. 4. For example, FIG. 3 is a cross-sectional view illustrating a cover window taken along line I-I' of FIG. 2 and a corresponding display panel.

Referring to FIGS. 2 and 3, the cover window 10 may include a base member 100, a first light blocking member 200, and a second light blocking member 250. The first light blocking member 200 and the second light blocking member 250 may be formed in at least a partial area of the base member 100 and may be spaced apart from each other.

In an embodiment, a first groove GR1 and a second groove GR2 may be formed in the base member 100. The first light blocking member 200 may be formed with the first groove GR1 as a boundary, and the second light blocking member 250 may be formed with the second groove GR2 as a boundary. For example, in an embodiment, the first groove GR1 may define an outer boundary of the first light blocking member 200 in which an outer surface of the first light blocking member 200 does not extend past (e.g., overflow out of) the first groove GR1 (e.g., in the first and/or second directions D1, D2). In an embodiment, the second groove GR2 may define an inner boundary of the second light blocking member 250 in which an inner surface of the second light blocking member 250 does not extend past the second groove GR2 (e.g., in the first and/or second directions D1, D2).

In an embodiment, the base member 100 may be a member constituting a basic skeleton (e.g., a main substrate) of the cover window 10. For example, in an embodiment, the base member 100 may include a transparent material. Accordingly, the image displayed on the display panel PNL may be displayed through the base member 100. For example, in an embodiment, the base member 100 may include glass or plastic. However, embodiments of the present inventive concept are not limited thereto.

In an embodiment in which the base member 100 includes plastic, the base member 100 may include at least one compound selected from polyimide, polyacrylate, polymethylmethacrylate ("PMMA"), poly carbonate ("PC"), polyethylenenaphthalate ("PEN"), polyvinylidene chloride, polyvinylidene difluoride ("PVDF"), polystyrene, ethylenevinylalcohol copolymer, polyethersulphone ("PES"), polyetherimide ("PEI"), polyphenylenesulfide ("PPS"), polyallylate, tri-acetyl cellulose ("TAC"), cellulose acetate propionate ("CAP"), or the like.

In an embodiment, the base member 100 may be divided into a display area DA and a non-display area NDA. An image displayed on the display panel PNL may be displayed through the display area DA. In an embodiment, the non-display area NDA may be adjacent to the display area DA (e.g., in the first and/or second directions D1, D2) and the non-display area NDA might not display an image provided by the display panel PNL. For example, in an embodiment, the display area DA may have a rectangular shape having corners having a curvature, and the non-display area NDA may be defined to surround the display area DA. For example, in an embodiment, the non-display area NDA may completely surround the display area DA (e.g., in the first and/or second directions D1, D2). However, embodiments of the present inventive concept are not limited thereto and the non-display area NDA might not surround at least one side of the display area DA in some embodiments. For example, the display area DA may extend to at least one edge of the display panel PNL and the display device 1 might not include a non-display area NDA adjacent to the display area DA on the at least one edge.

Figure 10:
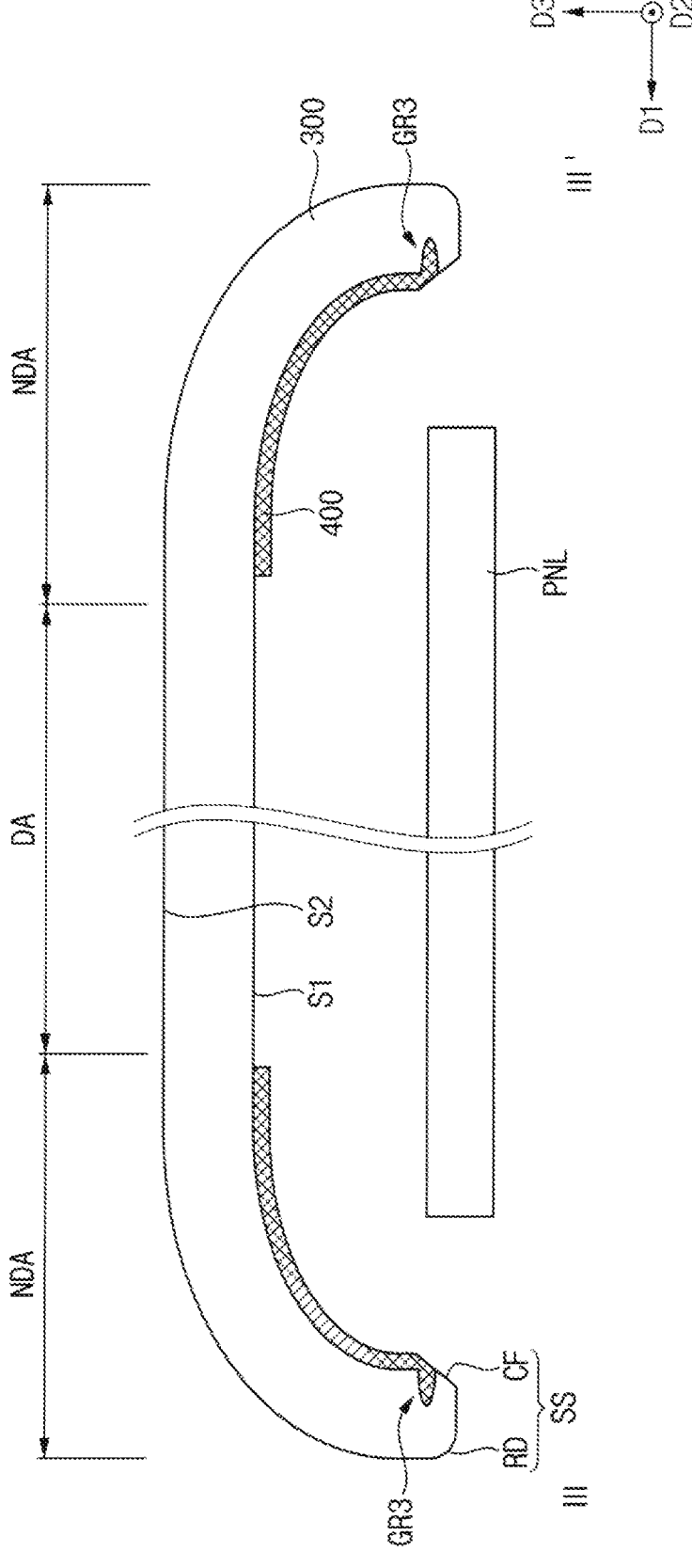
FIG. 10 is a cross-sectional view taken along line III-III' of FIG. 9 illustrating the display device of FIG. 8 according to an embodiment of the present inventive concept.

In an embodiment, the display area DA and the non-display area NDA of the base member 100 may be relatively flat and may extend substantially in a plane defined in the first and second directions D1, D2. For example, the display area DA and the non-display area NDA of the base member 100 may be substantially parallel to the display panel PNL. However, embodiments of the present inventive concept are not limited thereto and the shape of the base member 100 may vary. For example, as shown in FIG. 10, in an embodiment, the non-display area NDA of the base member 100 may be curved toward the display panel PNL. The shape of the base member 100 may be variously arranged and embodiments of the present inventive concept are not limited thereto.

In an embodiment, the base member 100 may include a first surface S1, a second surface S2, and a side surface SS. In an embodiment, the first surface S1 and the second surface S2 may each extend in a plane defined by the first direction D1 and the second direction D2. The side surface SS may connect the first surface S1 and the second surface S2. In addition, the first surface S1 may face the display panel PNL, and the second surface S2 may be positioned opposite to the first surface S1 (e.g., in the third direction D3).

In an embodiment, as shown in FIG. 3, the side surface SS adjacent to the first surface S1 may be a chamfered surface CF which is inclined (e.g., may extend between the first and third directions D1, D3). In addition, the side surface SS adjacent to the second surface S2 may be a round surface RD having a curved surface.

Referring to FIGS. 4 and 5, in an embodiment, the first groove GR1 may be formed in the non-display area NDA of the base member 100 along a normal direction perpendicular to the first surface S1 (e.g., in the third direction D3). A position where the first groove GR1 is formed on the base member 100, a depth of the first groove GR1 in the third direction D3 from the first surface S1 towards the second surface S2 of the base member 100, and an area of the first groove GR1 in the first and second directions D1 and D2 may vary, such as to provide a certain strength for the base member 100. For example, an internal stress of the base member 100 may have a behavior that changes according to a depth toward a point ½ of the thickness of the base member 100 (e.g., length in the third direction D3). The stress behavior may include surface compressive stress ("CS"), depth of compressive layer in the third direction D3 ("DOL"), and central tensile stress ("CT"). In an embodiment, the central tensile stress may satisfy the following equation.

$$CT = \frac{CS \times DOL}{Thickness - 2 \times DOL} \qquad \langle \text{Equation 1} \rangle$$

The position where the first groove GR1 is formed, the depth of the first groove GR1 in the third direction D3, and the size of the first groove GR1 in the first and second directions D1 and D2 may be set in a range that provides a minimum predetermined central tensile stress as determined by the above Equation 1.

In addition, the first groove GR1 may be formed using a laser LZ (FIG. 5), and may have a semi-elliptical shape in a cross-section (e.g., in a plane defined in the first and third directions D1, D3). In an embodiment, a source of the laser LZ may be selected according to the characteristics of the base member 100 and the characteristics of the first light blocking member 200. For example, an appropriate width and an appropriate depth of the first groove GR1 may be set, and a source of the laser LZ capable of forming the width and the depth may be selected, depending on the thickness of the base member 100, the material constituting the base member 100, and the material constituting the first light blocking member 200.

In addition, in an embodiment, as shown in FIGS. 2 and 3, the first groove GR1 may be formed adjacent to an outer portion of the non-display area NDA, and may be formed between the chamfered surface CF and the display area DA (e.g., in the first direction D1 and/or second direction D2).

The first light blocking member 200 may be disposed on the first surface S1 of the base member 100 (e.g., disposed directly thereon in the third direction D3). For example, the first light blocking member 200 may be disposed between the base member 100 and the display panel PNL (e.g., in the third direction D3). In addition, in a plan view (e.g., in a plane defined in the first and second directions D1, D2), the first light blocking member 200 may be formed between the display area DA and the first groove GR1, and may be disposed with the first groove GR1 forming a boundary of the first light blocking member 200, such as an outer boundary of the first light blocking member 200. For example, the first light blocking member 200 may be disposed in the first groove GR1 adjacent to the chamfered surface CF and may extend (e.g., in the first and/or second directions D1, D2) from the chamfered surface CF throughout at least a portion of the non-display area NDA positioned between the display area DA and the first groove GR1. In some embodiments, the first light blocking member 200 may be disposed in the first groove GR1 adjacent to the chamfered surface CF and may extend continuously from the first groove GR1 to the border between the non-display area NDA and the display area DA.

The first light blocking member 200 may absorb or block light emitted from the display panel PNL. Accordingly, the first light blocking member 200 may block the light directed to the first light blocking member 200 and may prevent light leakage which may occur resulting in transmission of light outside of the base member 100.

The first light blocking member 200 may be disposed on the non-display area NDA (e.g., in the third direction D3). The first light blocking member 200 may include a first light blocking layer 210, a second light blocking layer 220, and a third light blocking layer 230. However, embodiments of the present inventive concept are not limited thereto and the number of the light blocking layers forming the first light blocking member 200 may vary. In an embodiment, the first to third light blocking layers 210, 220, and 230 may be sequentially stacked (e.g., in the third direction D3). In an embodiment, the first light blocking layer 210 may be disposed with the first groove GR1 as a boundary, and may fill the first groove GR1. The second light blocking layer 220 may be disposed under the first light blocking layer 210 (e.g., in the third direction D3), and the third light blocking layer 230 may be disposed under the second light blocking layer 220 (e.g., in the third direction D3). In addition, widths of the first to third light blocking layers 210, 220, and 230 in the first direction D1 may vary, such as in consideration of process deviations. For example, as shown in FIG. 3, the width of the first light blocking layer 210 may be greater than the width of the second light blocking layer 220, and the width of the second light blocking layer 220 may be greater than the width of the third light blocking layer 230. However, the widths of the first to third light blocking layers 210, 220, 230 may vary and the widths of each of the light blocking layers and the relationship of the widths to each other are not limited thereto.

Figure 6:
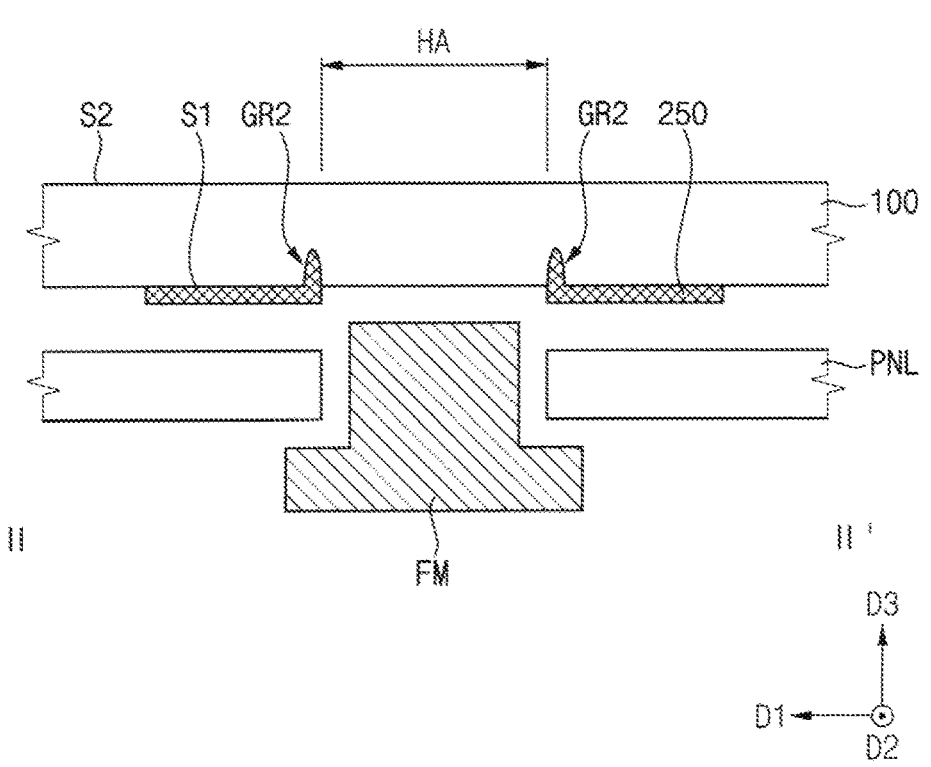
FIG. 6 is a cross-sectional view taken along line II-II' of FIG. 2 illustrating the display device of FIG. 1 according to an embodiment of the present inventive concept.

FIG. 6 is a cross-sectional view illustrating the display device of FIG. 1. For example, FIG. 6 is a cross-sectional view illustrating a cover window taken along line II-II' of FIG. 2 and a corresponding display panel.

Referring to FIGS. 2 and 6, in an embodiment, the display area DA of the base member 100 may include a hole area HA. The second groove GR2 extending in a normal direction perpendicular to the first surface S1 (e.g., the third direction D3) may be formed in the base member 100 and may extend from the first surface S1 of the base member 100 towards the second surface S2 of the base member 100. The second groove GR2 may be formed in substantially the same manner as the method of forming the first groove GR1 described with reference to FIG. 5. While the hole area HA is shown in FIG. 2 as being formed in an upper area of the display area DA (e.g., in the second direction D2), embodiments of the present inventive concept are not limited thereto and the hole area HA may be formed in various different regions of the display area DA. Additionally, in some embodiments, the base member 100 may include a plurality of hole areas HA.

In addition, in an embodiment, the second groove GR2 may be formed along the shape of the hole area HA to surround the hole area HA. For example, the second groove GR2 may surround an outer surface of the hole area HA (e.g., in the first and/or second directions D1, D2).

As shown in FIG. 6, the second light blocking member 250 may be disposed on the first surface S1 of the base member 100. For example, the second light blocking member 250 may extend between the base member 100 and the display panel PNL (e.g., in a third direction D3). In addition, in a plan view, the second light blocking member 250 may be disposed with the second groove GR2 as a boundary. For example, the second groove GR2 may define an inner boundary of the second light blocking member 250. For example, the second light blocking member 250 may fill the second groove GR2. In an embodiment, the second light blocking member 250 may include the same material as the first light blocking member 200. However, embodiments of the present inventive concept are not limited thereto.

In an embodiment, a hole may be formed in the display panel PNL overlapping the hole area HA (e.g., in the third direction D3). Accordingly, the display panel PNL may be penetrated by the hole (e.g., in the third direction D3). For example, in an embodiment, the hole may extend through an entire thickness of the display panel PNL. The display device 1 may further include a functional module FM (e.g., a camera module, an illuminance sensor, etc.) overlapping the hole area HA (e.g., in the third direction D3). For example, in embodiments in which the display panel PNL includes a plurality of hole areas HA, at least one functional module FM may overlap each hole area HA. The functional module FM may operate using external light incident to the hole area HA, and the second light blocking member 250 may suppress light spread from the functional module FM.

Figure 7:
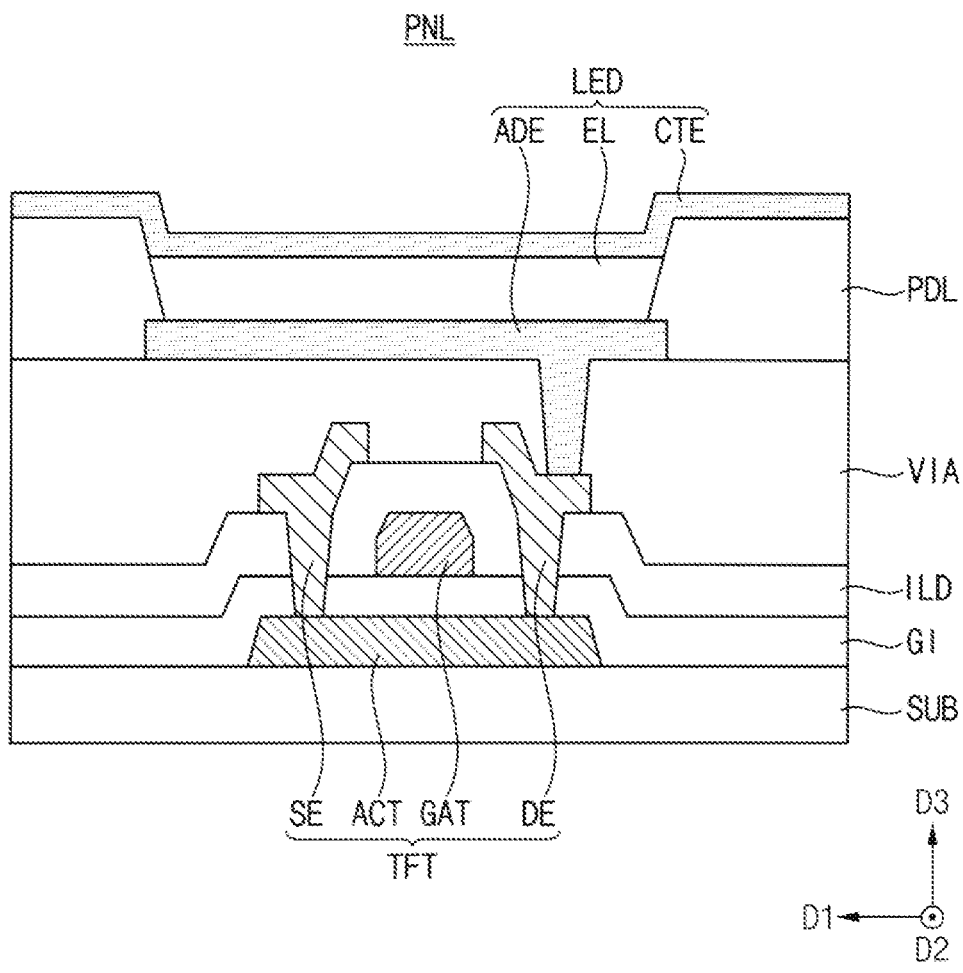
FIG. 7 is a cross-sectional view illustrating a display panel included in the display device of FIG. 1 according to an embodiment of the present inventive concept.

FIG. 7 is a cross-sectional view illustrating a display panel included in the display device of FIG. 1.

Referring to FIG. 7, the display panel PNL may include an active pattern ACT, a gate insulating layer GI, a gate electrode GAT, an interlayer insulating layer ILD, a source electrode SE, a drain electrode DE, a via insulating layer VIA, a first electrode ADE, a pixel defining layer PDL, an organic emission layer EL, and a second electrode CTE. The active pattern ACT, the gate electrode GAT, the source electrode SE, and the drain electrode DE may constitute a transistor TFT. The first electrode ADE, the organic emission layer EL, and the second electrode CTE may constitute a light emitting diode LED.

The active pattern ACT may be disposed on the substrate SUB (e.g., disposed direction thereon in the third direction D3). In an embodiment, the active pattern ACT may include a silicon semiconductor. For example, the active pattern ACT may include amorphous silicon, polycrystalline silicon, or the like. However, embodiments of the present inventive concept are not limited thereto and the material of the active pattern ACT may vary. For example, in an embodiment, the active pattern ACT may include an oxide semiconductor.

The gate insulating layer GI may cover the active pattern ACT and may be disposed on the substrate SUB. For example, a lower surface of the gate insulating layer GI may directly contact an upper surface of the substrate SUB and upper and lateral side surfaces of the active pattern ACT. In an embodiment, the gate insulating layer GI may include an inorganic insulating material. For example, the gate insulating layer GI may include at least one compound selected from silicon oxide, silicon nitride, silicon oxynitride, or the like.

The gate electrode GAT may be disposed on the gate insulating layer GI (e.g., disposed directly thereon in the third direction D3). In an embodiment, the gate electrode GAT may include at least one material selected from a metal, an alloy, a conductive metal oxide, a transparent conductive material, or the like. For example, the gate electrode GAT may include silver ("Ag"), an alloy containing silver, molybdenum ("Mo"), an alloy containing molybdenum, aluminum ("Al"), an alloy containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), or the like.

The interlayer insulating layer ILD may cover the gate electrode GAT and may be disposed on the gate insulating layer GI. For example, a lower surface of the interlayer insulating layer ILD may directly contact an upper surface of the gate insulating layer GI and an upper surface and lateral side surfaces of the gate electrode GAT. In an embodiment, the interlayer insulating layer ILD may include an inorganic insulating material.

The source electrode SE and the drain electrode DE may be disposed on the interlayer insulating layer ILD (e.g., disposed directly thereon in the third direction D3). In an embodiment, the source electrode SE and the drain electrode DE may directly contact the active pattern ACT, such as through via holes extending through the interlayer insulating layer ILD and the gate insulating layer GI. In an embodiment, the source electrode SE and the drain electrode DE may include at least one material selected from a metal, an alloy, a conductive metal oxide, a transparent conductive material, or the like.

The via insulating layer VIA may cover the source electrode SE and the drain electrode DE, and may be disposed on the interlayer insulating layer ILD. For example, a lower surface of the via insulating layer VIA may directly contact an upper surface of the interlayer insulating layer ILD and an upper surface and lateral side surfaces of the source electrode SE and the drain electrode DE. In an embodiment, the via insulating layer VIA may include an organic insulating material. For example, the via insulating layer VIA may include at least one material selected from a photoresist, a polyacrylic resin, a polyimide resin, an acrylic resin, or the like. Accordingly, the via insulating layer VIA may have a substantially flat top surface.

The first electrode ADE may be disposed on the via insulating layer VIA (e.g., disposed directly thereon in the third direction D3). In an embodiment, the first electrode ADE may directly contact the drain electrode DE, such as through a via hole extending through the via insulating layer VIA. In an embodiment, the first electrode ADE may include a reflective metal material or a transparent metal material. For example, in an embodiment, the first electrode ADE may include at least one compound selected from silver ("Ag"), an alloy containing silver, molybdenum ("Mo"), an alloy containing molybdenum, aluminum ("Al"), an alloy containing aluminum, aluminum. nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), or the like. In addition, the first electrode ADE may have a multilayer structure including Ag/ITO/Ag.

The pixel defining layer PDL may cover an end of the first electrode ADE and may be disposed on the via insulating layer VIA. For example, the pixel defining layer PDL may cover lateral edges and a portion of the upper surface of the first electrode ADE. In an embodiment, the pixel defining layer PDL may include an organic material. An opening exposing the first electrode ADE may be formed in the pixel defining layer PDL.

The organic emission layer EL may be disposed on the first electrode ADE (e.g., in the third direction D3). For example, the organic emission layer EL may be disposed in the opening. The organic emission layer EL may generate light based on a voltage difference between the first electrode ADE and the second electrode CTE. In addition, in an embodiment, the organic emission layer EL may include at least one functional layer (e.g., a hole injection layer, a hole transport layer, an electron transport layer, an electron injection layer, etc.) to increase the luminous efficiency of the organic emission layer EL.

The second electrode CTE may be disposed on the organic emission layer EL (e.g., in the third direction D3). In an embodiment, the second electrode CTE may be formed in a plate shape and may include a reflective metal material or a transparent metal material.

Figure 8:
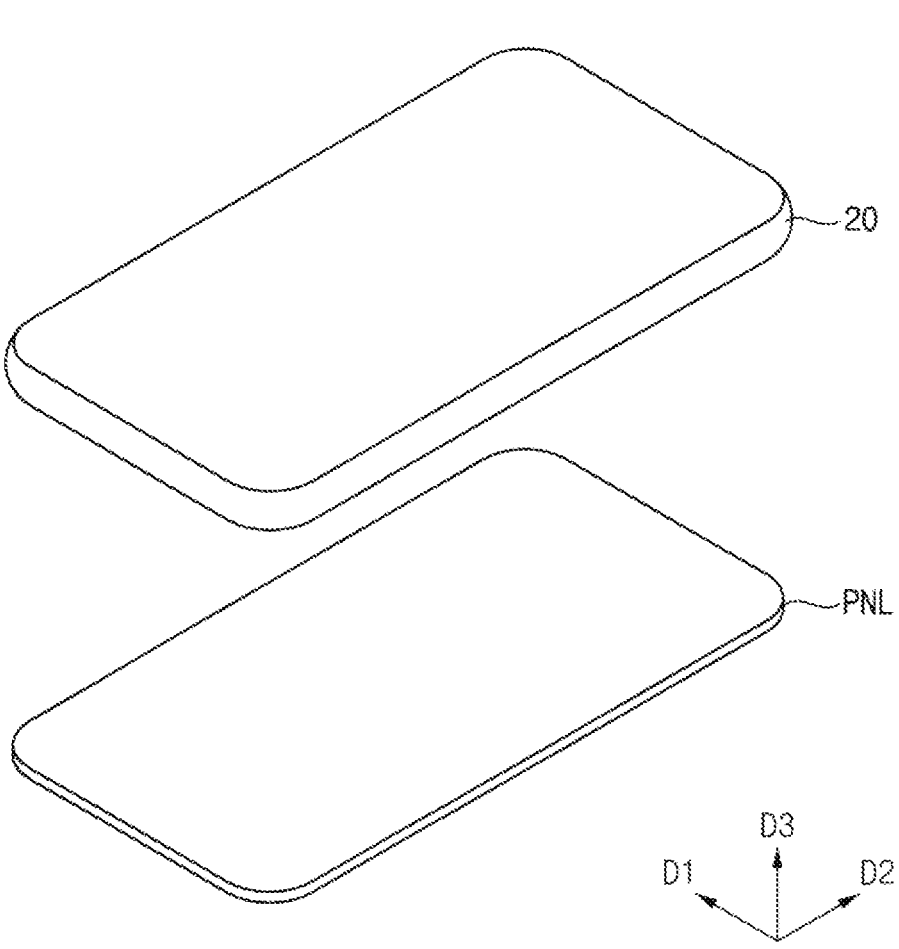
FIG. 8 is an exploded perspective view illustrating a display device according to an embodiment of the present inventive concept.

FIG. 8 is an exploded perspective view illustrating a display device according to an embodiment of the present inventive concept.

Referring to FIG. 8, a display device 2 according to an embodiment of the present inventive concept may include the display panel PNL and a cover window 20. The display panel PNL may be substantially the same as the display panel PNL described with reference to FIG. 1 and a repeated description of similar or identical elements may be omitted for convenience of explanation.

The cover window 20 may cover the display panel PNL and may protect the display panel PNL. In an embodiment, the cover window 20 may have substantially the same shape as the shape of the display panel PNL, and may have a planar area greater than a planar area of the display panel PNL.

Figure 9:
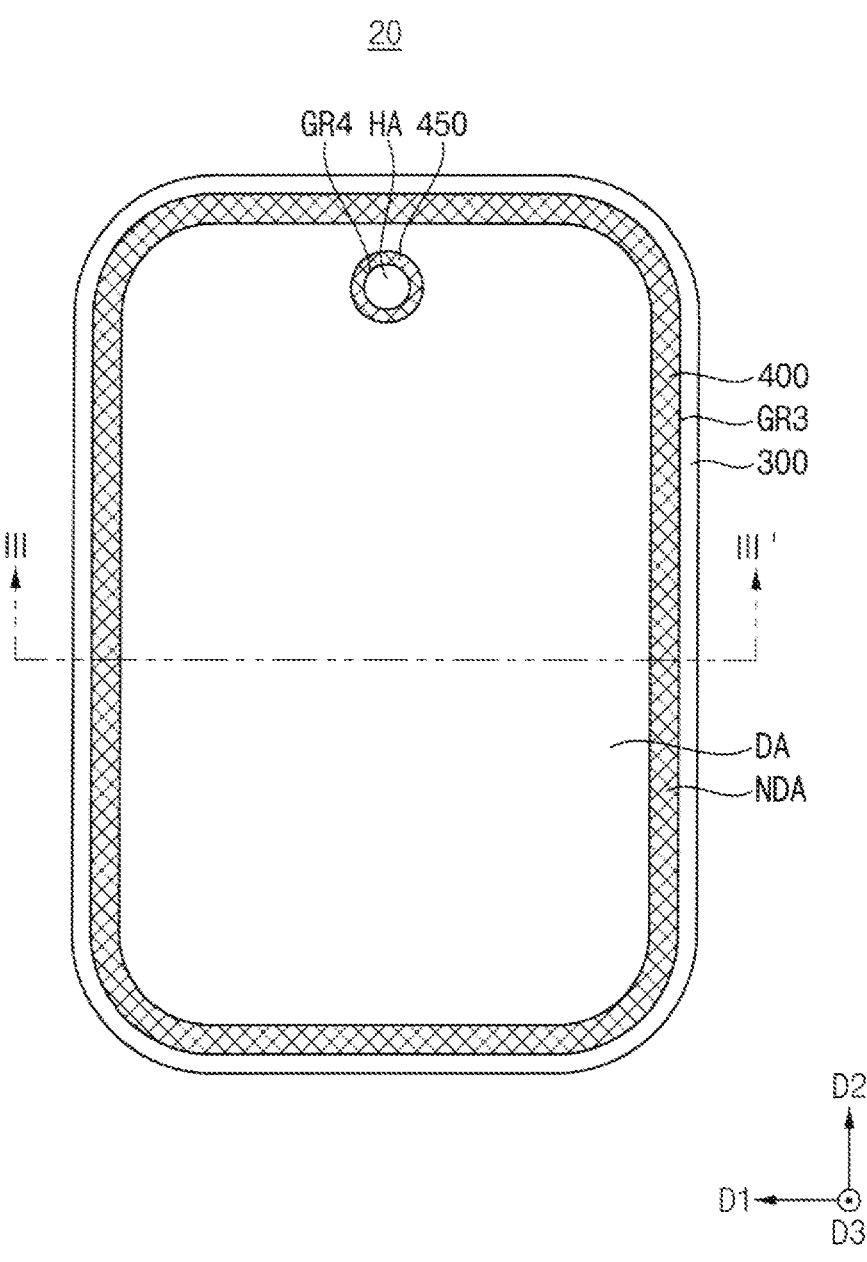
FIG. 9 is a plan view illustrating a cover window included in the display device of FIG. 8 according to an embodiment of the present inventive concept.
Figure 11:
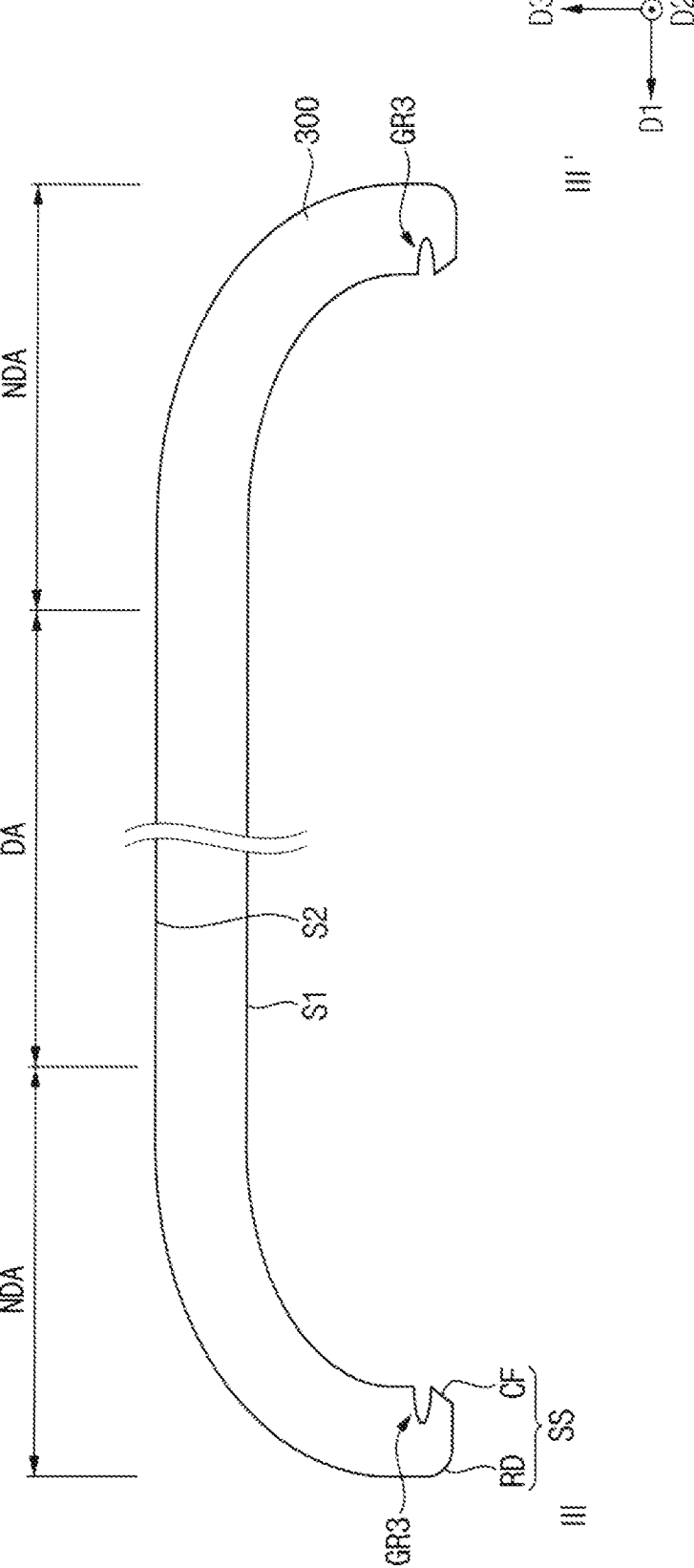
FIG. 11 is a cross-sectional view taken along line III-III' of FIG. 9 illustrating a base member included in the display device of FIG. 8 according to an embodiment of the present inventive concept.

FIG. 9 is a plan view illustrating a cover window included in the display device of FIG. 8. FIG. 10 is a cross-sectional view illustrating the display device of FIG. 8. FIG. 11 is a cross-sectional view illustrating a base member included in the display device of FIG. 8. For example, FIG. 10 is a cross-sectional view illustrating a cover window taken along line III-III' of FIG. 9 and a corresponding display panel.

Referring to FIGS. 9 and 10, the cover window 20 may include a base member 300, a first light blocking member 400, and a second light blocking member 450. The first light blocking member 400 and the second light blocking member 450 may be formed in at least a partial area of the base member 300.

In an embodiment, a first groove GR3 and a second groove GR4 may be formed in the base member 300. The first light blocking member 400 may be formed with the first groove GR3 defining a boundary, such as an outer boundary, and the second light blocking member 450 may be formed with the second groove GR4 defining a boundary, such as an inner boundary.

The base member 300 may be a member constituting a basic skeleton (e.g., a main substrate) of the cover window 20. In an embodiment, the base member 300 may include a transparent material. Accordingly, the image displayed on the display panel PNL may be displayed through the base member 300. For example, the base member 300 may include glass or plastic. However, embodiments of the present inventive concept are not limited thereto.

In an embodiment, the base member 300 may be divided into a display area DA and a non-display area NDA. An image displayed on the display panel PNL may be displayed through the display area DA. In an embodiment, the non-display area NDA may be adjacent to the display area DA (e.g., in the first and/or second directions D1, D2). For example, the display area DA may have a rectangular shape having corners having a curvature, and the non-display area NDA may be defined to surround the display area DA. However, embodiments of the present inventive concept are not limited thereto.

In an embodiment, the display area DA of the base member 300 may be relatively flat, and the non-display area NDA may be curved toward the display panel PNL (e.g. in the third direction DR3). Accordingly, the cover window 20 may cover the front and side surfaces of the display panel PNL and may protect the display panel PNL.

In an embodiment, the base member 300 may include a first surface S1, a second surface S2, and a side surface SS. The first surface S1 and the second surface S2 may each have portions that extend in a plane defined in the first direction D1 and the second direction D2 and may have portions that are bent to extend at an incline. The side surface SS may connect the first surface S1 and the second surface S2. In addition, the first surface S1 may face the display panel PNL, and the second surface S2 may be opposite to the first surface S1 (e.g., in the third direction D3).

In an embodiment, the side surface SS adjacent to the first surface S1 may be a chamfered surface CF which is inclined. In addition, the side surface SS adjacent to the second surface S2 may be a round surface RD having a curved surface.

Referring to FIG. 11, in an embodiment, the first groove GR1 may be formed in the non-display area NDA in the base member 100 along a normal direction perpendicular to the first surface S1. For example, as shown in FIG. 11, the first groove GR1 may be formed on an inclined portion of the first surface S1 and may extend substantially in the first direction D1 towards the second surface S2. However, embodiments of the present inventive concept are not limited thereto. In an embodiment, the first groove GR3 may be formed using a laser, and may have a semi-elliptical shape in a cross-section.

In an embodiment in which the non-display area NDA of the base member 300 is curved toward the display panel PNL, i) the bending of the base member 300 to a particular angle and ii) the forming of the first groove GR3 having a particular dimension may be variously performed. For example, the process sequence may be set so that the cover window 20 is not damaged. In an embodiment, the first groove GR3 may be formed by irradiating the laser in a direction normal to the curved base member 300 after the bending the base member 300 is performed. However, embodiments of the present inventive concept are not limited thereto.

In addition, in an embodiment, as shown in FIGS. 9 and 10, the first groove GR3 may be formed to be adjacent to an outer portion of the non-display area NDA, and may be formed between the chamfered surface CF and the display areas DA.

The first light blocking member 400 may be disposed on the first surface S1 of the base member 300. For example, the first light blocking member 400 may extend between the base member 300 and the display panel PNL. In addition, in a plan view, the first light blocking member 400 may be formed between a portion of the non-display area DA extending between the display area DA and the first groove GR3, and may be disposed in the first groove GR3 with the first groove GR3 forming a boundary of the first light blocking member 400, such as an outer boundary.

The first light blocking member 400 may absorb or block light emitted from the display panel PNL. Accordingly, the first light blocking member 400 may block the light directed to the first light blocking member 400 and may prevent light leakage that may occur resulting in transmission of light outside of the base member 300.

In addition, in an embodiment, the display area DA of the base member 300 may include the hole area HA. The second groove GR4 extending in a normal direction perpendicular to the first surface S1 (e.g., the third direction D3) may be formed in the base member 300. The second light blocking member 450 may be disposed on the first surface S1 of the base member 300. In addition, the second light blocking member 450 may be disposed in the second groove GR4 with the second groove GR4 forming a boundary of the second light blocking member 450, such as an inner boundary. However, the second groove GR4 and the second light blocking member 450 may be the same as the second groove GR2 and the second light blocking member 250 described with reference to FIGS. 2 and 6, respectively.

The display devices 1 and 2 according to embodiments of the present inventive concept may include a cover window 10 or 20 and a display panel PNL. The cover windows 10 or 20 may include a base member 100 or 300 and a first light blocking member 200 or 400. A first groove GR1 or GR3 may be formed in the base member 100 or 300, and the first light blocking member 200 or 400 may be disposed with the first groove GR1 or GR3 as a boundary, such as an outer boundary. As the first groove GR1 or GR3 having a semi-elliptical shape in a cross-section are formed in the base member 100 or 300, the surface resistance of the surfaces of the first groove GR1 or GR3 may be increased, and a periphery of the first groove GR1 or GR3 may be hydrophobized. Accordingly, the first light blocking member 200 or 400 may fill the first groove GR1 or GR3 and might not overflow to the outside of the first groove GR1 or GR3. Accordingly, the processing precision of the first light blocking member 200 or 400 may be increased. Therefore, the first light blocking member 200 or 400 may be accurately printed on a target area.

Although certain embodiments and implementations have been described herein, other embodiments and modifications will be apparent from this description. Accordingly, the present inventive concept is not limited to such embodiments, but rather various obvious modifications and equivalent arrangements would be apparent to a person of ordinary skill in the art.

What is claimed is:

1. A display device comprising:
a display panel configured to display an image;
a base member disposed on the display panel and including a display area and a non-display area adjacent to the display area, the base member having a first surface facing that is a closest surface of the base member to the display panel;
a first groove formed on the first surface in the non-display area; and
a first light blocking member disposed on the first surface of the base member and extending along at least a portion of the first surface positioned between the display area and the first groove, wherein the first light blocking member extends between the first surface and the display panel in a thickness direction of the display device.

2. The display device of claim 1, wherein:
the first light blocking member is disposed in the first groove; and
the first groove defines a boundary of the first light blocking member.

3. The display device of claim 2, wherein the first light blocking member fills the first groove.

4. The display device of claim 1, wherein the first light blocking member is disposed on the non-display area.

5. The display device of claim 1, wherein:
the non-display area is defined to surround the display area,
wherein the first groove is formed adjacent to an outer portion of the non-display area.

6. The display device of claim 1, wherein:
the display area includes at least one hole area;
at least one functional module overlaps the at least one hole area; and
the base member includes a second groove formed to surround the hole area.

7. The display device of claim 6, further comprising:
a second light blocking member disposed to surround the hole area and filling the second groove.

8. The display device of claim 1, wherein the non-display area of the base member is relatively flat.

9. The display device of claim 1, wherein the non-display area of the base member is curved toward the display panel.

10. The display device of claim 1, wherein the display area of the base member is relatively flat.

11. The display device of claim 1, wherein:
the base member further comprises a second surface opposing the first surface and a side surface connecting the first surface and the second surface,
wherein the side surface adjacent to the first surface is a chamfered surface that is inclined.

12. The display device of claim 11, wherein the first groove is formed between the chamfered surface and the display area.

13. The display device of claim 11, wherein the side surface adjacent to the second surface is a round surface.

14. The display device of claim 1, wherein the first groove is formed using a laser.

15. The display device of claim 1, wherein the display panel comprises:
a substrate;
at least one thin film transistor disposed on the substrate; and
a light emitting diode electrically connected to the at least one thin film transistor.

16. The display device of claim 15, wherein the light emitting diode comprises:
a first electrode connected to the thin film transistor;
an organic emission layer disposed on the first electrode; and
a second electrode disposed on the organic emission layer.

17. A display device comprising:
a display panel configured to display an image;
a base member disposed on the display panel and including a display area and a non-display area adjacent to the display area, the base member having a first surface facing that is a closest surface of the base member to the display panel and a chamfered surface adjacent to the first surface and inclined,
a first groove formed on the first surface in the non-display area; and
a first light blocking member disposed on the first surface of the base member and extending along at least a portion of the first surface between the display area and the first groove, wherein the first light blocking member extends between the first surface and the display panel in a thickness direction of the display device.

18. The display device of claim 17, wherein the first light blocking member fills the first groove.

19. The display device of claim 17, wherein:

the non-display area is defined to surround the display area, wherein the first groove is formed adjacent to an outer portion of the non-display area.

20. The display device of claim 17, wherein:

the display area includes at least one hole area;

at least one functional module overlaps the at least one hole area; and the base member includes a second groove formed to surround the hole area.

21. A display device comprising:

a display panel configured to display an image;

a base member disposed on the display panel and including a display area and a non-display area adjacent to the display area, the base member having a first surface facing that is a closest surface of the base member to the display panel;

a first groove formed on the first surface in the non-display area, the first groove having a semi-elliptical shape in a cross-section; and a first light blocking member disposed in the first groove and extending along at least a portion of the non-display area, wherein the first light blocking member extends between the first surface and the display panel in a thickness direction of the display device.

22. The display device of claim 21, wherein the first groove defines an outer boundary of the first light blocking member.

* * * * *